(12) United States Patent
Janko et al.

(10) Patent No.: US 6,633,329 B2
(45) Date of Patent: Oct. 14, 2003

(54) FROZEN FIELD DETECTION OF FORMERLY ENCODED VIDEO

(75) Inventors: Bozidar Janko, Portland, OR (US); Steven D. Maurer, Aloha, OR (US)

(73) Assignee: Tektronix, Inc., Beaverton, OR (US)

( * ) Notice: Subject to any disclaimer, the term of this patent is extended or adjusted under 35 U.S.C. 154(b) by 399 days.

(21) Appl. No.: 09/778,184

(22) Filed: Feb. 6, 2001

(65) Prior Publication Data

US 2002/0105597 A1 Aug. 8, 2002

(51) Int. Cl.<sup>7</sup> .............................................. H04N 17/00
(52) U.S. Cl. ....................... 348/180; 348/700; 348/722
(58) Field of Search ................................. 348/180, 192, 348/559, 699–701, 722, 526; 382/190, 192, 194, 224, 228

(56) References Cited

U.S. PATENT DOCUMENTS

| | | | | |
|---|---|---|---|---|
| 4,214,263 A | * | 7/1980 | Kaiser | 358/22 |
| 5,119,191 A | * | 6/1992 | Van den Heuvel | 358/97 |
| 6,122,433 A | * | 9/2000 | McLaren | 386/68 |
| 6,259,480 B1 | * | 7/2001 | Yamauchi et al. | 348/452 |
| 6,377,297 B1 | * | 4/2002 | Janko et al. | 348/180 |

FOREIGN PATENT DOCUMENTS

JP  02-000115766 A  *  4/2000  ............ H04N/7/24

* cited by examiner

Primary Examiner—Victor R. Kostak
(74) Attorney, Agent, or Firm—Francis I. Gray

(57) ABSTRACT

A method of detecting frozen fields in a video signal that has undergone analog encoding at some point along a transmission path acquires the video signal as a digital video signal. Every field of the digital video signal and its nth subsequent field are selected as a pair, where n is an integer multiple of the number of fields required for one cycle of color phasing in the analog encoding. The pairs of the selected fields are compared and, if the difference is essentially zero, a frozen field error is indicated.

15 Claims, 2 Drawing Sheets

FROZEN FIELD DETECTION OF FORMERLY ENCODED VIDEO

BACKGROUND OF THE INVENTION

The present invention relates to the monitoring of errors in video signals, and more particularly to the detection of frozen fields in video that has been encoded according to an analog television standard.

Companies that distribute video over compressed pathways, such as satellite or digital cable distributors, have hundreds of channels that need to be monitored for defects. These companies need an automated method of monitoring for such defects. One of the most common of these errors is frozen fields, in which the video ceases to change, or is black, due to equipment failure. The current instrument that is used to detect such an error is the Tektronix PQM300 Picture Quality Monitor manufactured by Tektronix, Inc. of Beaverton, Oreg., United States of America which uses a single-ended measurement algorithm described in U.S. patent application Ser. No. 09/152,495 entitled "Picture Quality Measurement Using Blockiness" and filed Sept. 10, 1998. However this single-ended blockiness measurement does not decide whether the blockiness being detected is caused by unacceptable CODEC deformation of the image or is the natural result of blockiness that exists within the video. A method for detecting blockiness caused by DCT-based CODECs is described in U.S. patent application Ser. No. 09/518,430 entitled "Blockiness Period Detection of DCT-Based CODECs" filed Mar. 3, 2000.

However if the frozen video is at any point in analog encoded format, such as NTSC or PAL, the chrominance variations inherent in these standards cause even visually identical fields to be significantly different on a pixel by pixel basis. Enough so that a measurement that determines the difference between two otherwise identical fields while not yielding false positives on similar, but non-identical, fields is extremely computationally expensive. This variance remains even if the video stream is subsequently converted back into a digital format. For example comparing field one of one frame to field one of the next frame results in indications of differences between the fields due to artifacts of the analog encoding process that are 180° out of phase due to the color phase clocking, even though the fields are otherwise identical—frozen.

What is desired is a means of detecting frozen fields in video data that has been at some point analog encoded.

BRIEF SUMMARY OF THE INVENTION

Accordingly the present invention provides a frozen field detection technique for previously analog encoded video data by obtaining a difference between each field and its nth subsequent field where the color phasing of the analog encoding standard is identical. Then when the difference is essentially zero, a frozen field indicator is initiated to indicate the presence of frozen fields in the video signal.

The objects, advantages and other novel features of the present invention are apparent from the following detailed description when read in conjunction with the appended claims and attached drawing figures.

BRIEF DESCRIPTION OF THE SEVERAL VIEW OF THE DRAWING

DETAILED DESCRIPTION OF THE INVENTION

Figure 1:
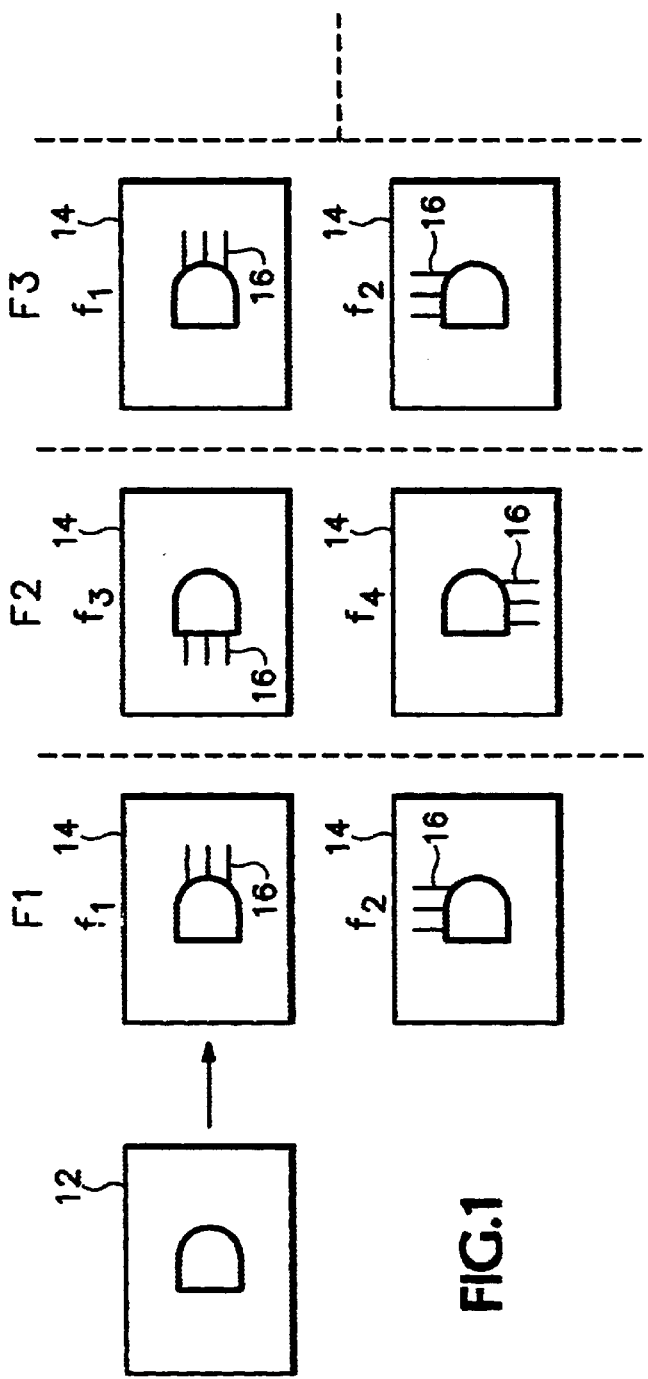
FIG. 1 is an illustrative view of a frozen frame and the aftermath of analog encoding upon the frozen frame.
Figure 2:
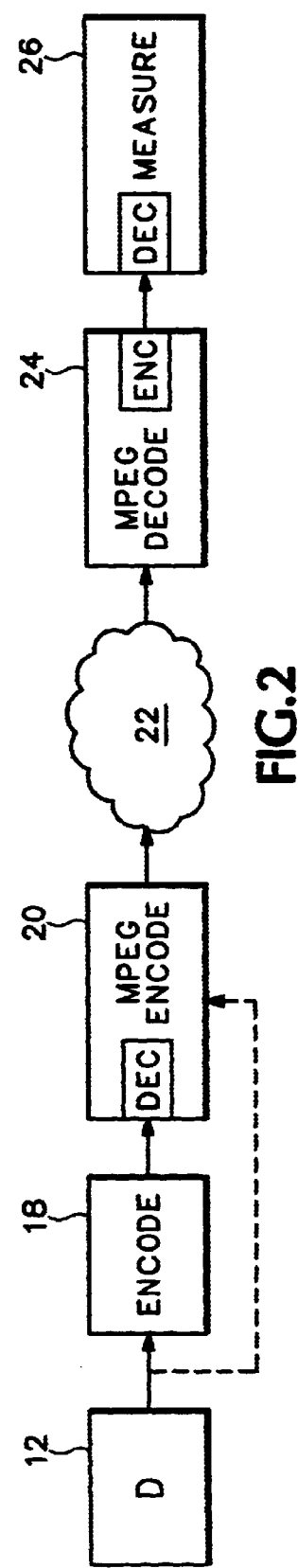
FIG. 2 is a block diagram view of a typical video signal transmission path.

As shown in FIGS. 1 and 2 a digital video signal at some point along its transmission path is converted to an analog encoded video signal according to a known television standard. FIG. 1 shows an input video frame 12 and subsequent frozen fields 14 when the input video frame at some point in its processing was analog encoded according to a known television standard—NTSC for this illustration. Field one of frame 1 of the received frames has some artifacts 16, shown as lines extending from one side of a letter "D" for illustrative purposes. While two kinds of artifacts normally are present, MPEG and NTSC decoding artifacts, in a frozen frame MPEG artifacts are constant. The NTSC decoding artifacts vary from frame to frame so that in field two due to the color phasing these artifacts 16 appear at a different point of the "D", as is the case for fields three and four. Therefore if fields one and three (field one of frame 2) are compared as in the normal case, the artifacts 16 result in a non-zero result, i.e., it does not indicate a frozen field. However at field one of frame three the color phasing again is the same, so that differencing of these fields results in an essentially zero value indicative of a frozen field.

Referring now to FIG. 2 the input digital video signal 12 may be input to an analog encoder 18 and then subsequently input to an MPEG encoder 20, which would have an analog decoder at its input, or may be input directly to the MPEG encoder. The output from the MPEG encoder 20 is then transmitted over some medium 22 to an MPEG decoder 24 which has at its output an analog encoder so that the video signal may be viewed on a television receiver. At the output of the MPEG decoder 24 is a picture quality measurement instrument 26 which has as one input an analog decoder to convert the encoded video to the original digital video for analysis. As is shown the original digital video signal 12 probably was analog encoded at least once, if not twice, along the transmission path resulting in the artifacts shown in FIG. 1.

Figure 3:
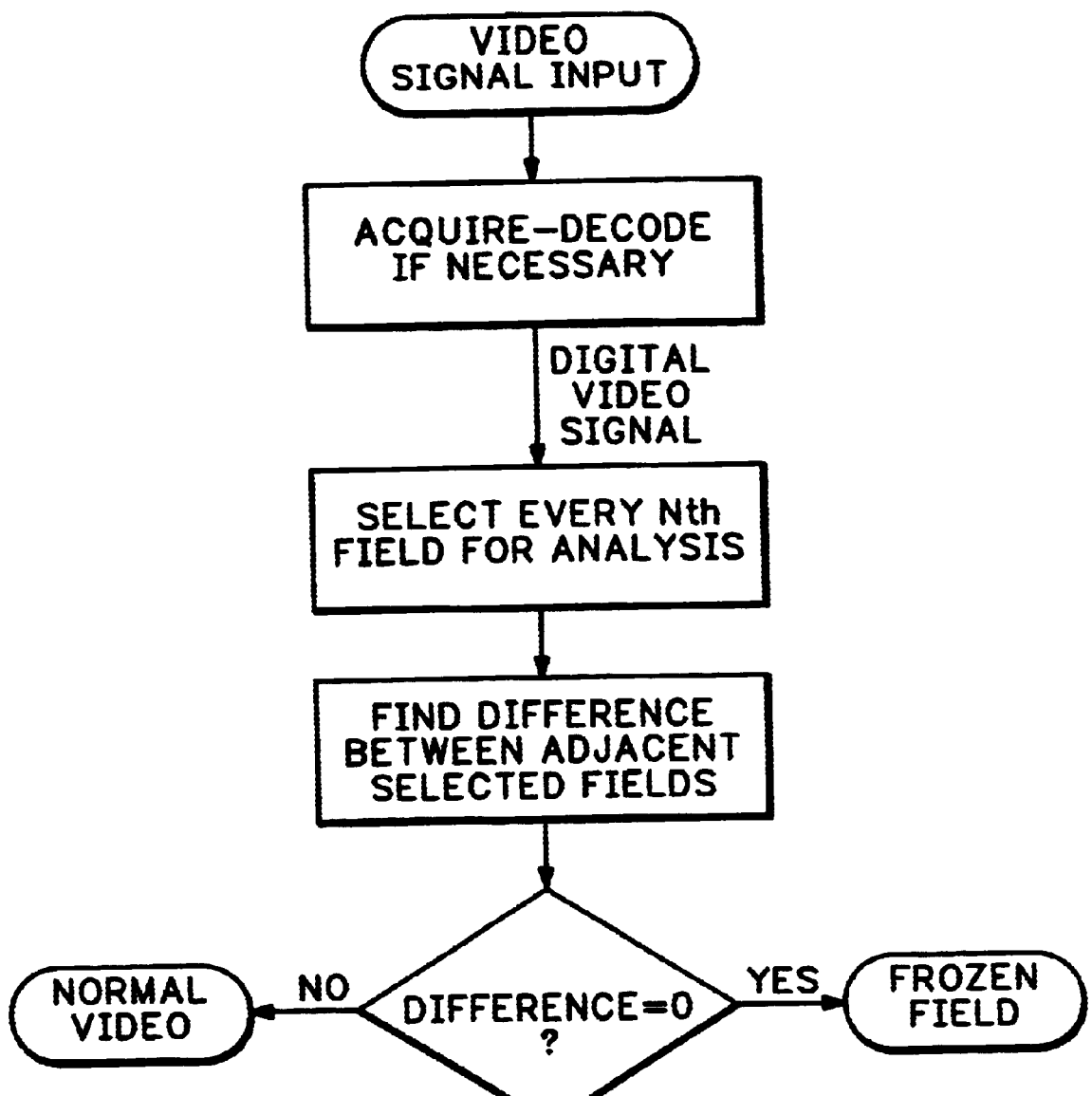
FIG. 3 is a block diagram view of a method of frozen field detection according to the present invention.

An algorithm for detecting frozen fields from previously encoded video signals is shown in FIG. 3. The measurement instrument 26 first acquires the video signal, decoding it if it is in an encoded format. The resulting acquired digital video signal is then processed field by field by selecting a current field and the subsequent nth field, where n is such that the two fields have the same color phasing. For NTSC n=4, for PAL n=8, for SECAM n=12, etc. For example with n=4 then field 1 is compared with field 5, field 2 is compared with field 6, etc. Since every field is measured, an absolute identification of where a frozen field sequence started may be determined. For multiple standard instruments n may be an integer multiple of the color phasing fields, so that for an NTSC/PAL instrument n=8 for example, while for an NTSC/PAL/SECAM instrument n=24. Then the difference between consecutive selected fields is obtained. If the difference is essentially zero, then a frozen field is detected and an alarm set. Otherwise normal video is deemed to be present and no alarms are indicated.

Thus the present invention provides for frozen field detection of video signals that have been subjected to analog encoding/decoding by selecting for analysis from the received video signal every nth field, where n is an integer multiple of the number of fields required for one cycle of color phasing by the analog encoding, the difference between consecutive selected fields indicating a frozen field if the difference is essentially zero.

What is claimed is:

1. A method of detecting frozen fields in a video signal that has undergone analog encoding comprising the steps of:

acquiring the video signal to produce a digitized video signal;

pairing every field of the digitized video signal with an nth subsequent field of the digitized video signal having the same color phasing;

comparing the paired fields to obtain a difference between the paired fields; and indicating frozen fields in the video signal if the difference is essentially zero.

2. The method as recited in claim 1 wherein n=4 when the analog encoding is according to the NTSC televison standard.

3. The method as recited in claim 1 wherein n=8 when the analog encoding is according to either the NTSC or PAL television standards.

4. The method as recited in claim 1 wherein n=24 when the analog encoding is according to either the NTSC, PAL or SECAM television standards.

5. The method as recited in claim 1 wherein the acquiring step comprises the steps of:

receiving an analog encoded video signal as the video signal; and decoding the analog encoded video signal to produce the digital video signal.

6. An apparatus for detecting frozen fields in a video signal that has undergone analog encoding comprising:

means for acquiring the video signal to produce a digitized video signal;

means for pairing each field with an nth subsequent field of the digitized video signal having the same color phasing;

means for comparing the paired fields to obtain a difference between the paired fields; and means for indicating frozen fields in the video signal if the difference is essentially zero.

7. The apparatus as recited in claim 6 wherein n=4 when the analog encoding is according to the NTSC televison standard.

8. The apparatus as recited in claim 6 wherein n=8 when the analog encoding is according to either the NTSC or PAL television standards.

9. The apparatus as recited in claim 6 wherein n=24 when the analog encoding is according to either the NTSC, PAL or SECAM television standards.

10. The apparatus as recited in claim 6 wherein the acquiring means comprises:

means for receiving an analog encoded video signal as the video signal; and means for decoding the analog encoded video signal to produce the digital video signal.

11. An apparatus for detecting frozen fields in a video signal that has undergone analog encoding comprising:

an acquisition system having as an input the video signal and producing as an output a digitized video signal;

a selector having an input coupled to the output of the acquisition system so that every field is paired with an nth subsequent field of the digitized video signal having the same color phasing to produce at an output the pairs of fields of the digitized video signal;

a comparator having an input coupled to the output of the selector and having an output providing a difference between the pairs of fields; and an indicator having an input coupled to the output of the comparator and having an output providing a frozen fields indicator for the video signal if the difference is essentially zero.

12. The apparatus as recited in claim 11 wherein n=4 when the analog encoding is according to the NTSC televison standard.

13. The apparatus as recited in claim 11 wherein n=8 when the analog encoding is according to either the NTSC or PAL television standards.

14. The apparatus as recited in claim 11 wherein n=24 when the analog encoding is according to either the NTSC, PAL or SECAM television standards.

15. The apparatus as recited in claim 11 wherein the acquisition system comprises:

a receiver having an input for receiving an analog encoded video signal as the video signal and having an output; and a decoder having an input coupled to the output of the receiver and having an output providing the digital video signal as the decoded version of the analog encoded video signal from the receiver.

* * * * *